Nov. 17, 1970        R. C. LO GIUDICE        3,540,058
WELDER MASK
Filed June 20, 1968

INVENTOR
Roberto Carlos Lo Giudice

United States Patent Office 3,540,058
Patented Nov. 17, 1970

---

3,540,058
WELDER MASK
Roberto C. Lo Giudice, 452 SW. 1st St.,
Miami, Fla. 33132
Filed June 20, 1968, Ser. No. 738,441
Int. Cl. A61f 9/06
U.S. Cl. 2—8        2 Claims

ABSTRACT OF THE DISCLOSURE

A protective mask adapted to cover the face of a welder during welding operations. The mask has a viewing slot for the eyes with an arc welding glass plate normally covering the slot. Electrically powered means under the control of the welder raises or lowers the plate to cover or open the slot as required.

SUMMARY OF THE INVENTION

My mask has a shield with the slot therein. A pair of vertical tracks are secured to the shield adjacent the slot. The plate is slidably disposed between the tracks. Electrically powered motorized means raises or lowers the plate as required. A mouth operated switch can be used for operating the plate without impairing use of both hands and feet.

DETAILED DESCRIPTION OF PREFERRED EMBODIMENT

Figure 1:
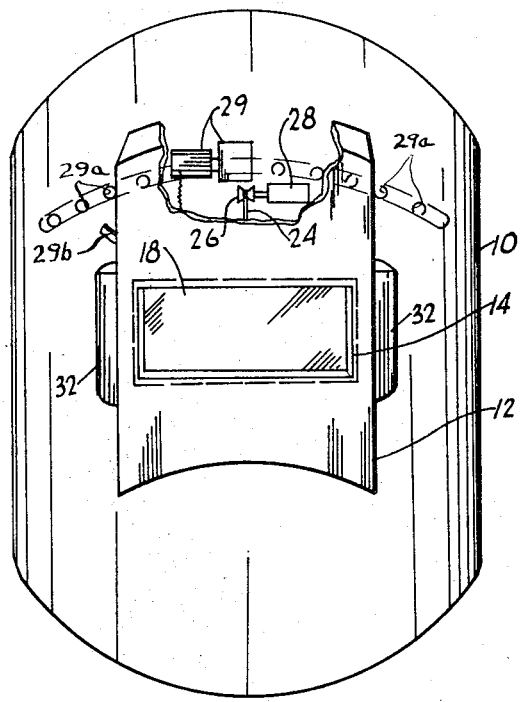
FIG. 1 is a front view of my invention.
Figure 2:
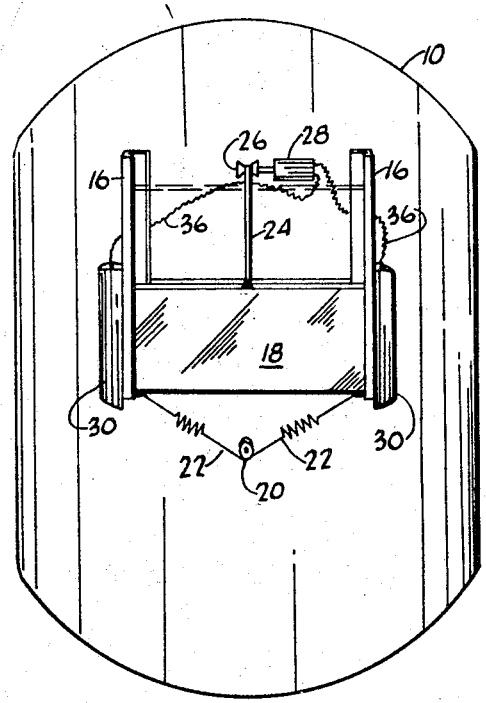
FIG. 2 is a rear view thereof.
Figure 3:
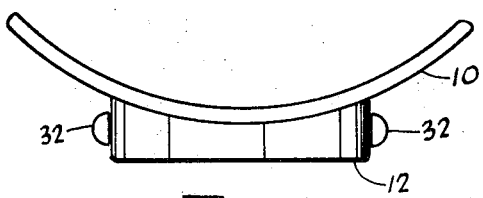
FIG. 3 is a top view thereof.
Figure 4:
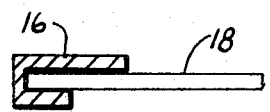
FIG. 4 is a detail view of a slide used in my invention.
Figure 5:
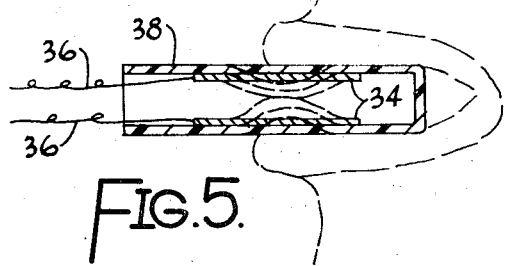
FIG. 5 is a cross sectional view of a mouth operated switch used in my invention.

Referring now to FIGS. 1–5, a mask 10 has a shield 12 with a horizontally elongated viewing slot 14. The slot can be open or can have a transparent glass plate therein. Disposed behind the slot are two spaced apart vertical rails 16 on each side of the slot which can be made of glass. A darkened arc welding glass plate 18 is disposed slidably in the rails.

A pulley 20, disposed below the slot and rotatably secured, supports a spring 22 connected at each end to the bottom of the plate to normally bias some in the lower position at which plate 18 is disposed in the light path through the slot.

The top edge of the plate is connected by line 24 to a wind up spool 26 rotated by the shaft of motor 28. When line 24 is fully wound up, the plate 18 is raised to permit non-darkened viewing. Motor 28 is powered by dry cells 30 disposed separately in oppositely disposed covers 32.

A flexible plastic tube 38 adapted to be placed in the mouth contains two normally separated conductors 34 connected in circuit by leads 36 to the motor and battery. When the user bites down on the tube, conductors 34 are short-circuited, completing the circuit to energize the motor and raise the plate.

When the tube is relaxed, the circuit is broken and the plate is in the normal position.

If desired an air turbine with battery powered motor as shown at 29 in FIG. 1 controlled by switch 29B can be used to circulate air through mask holes 29A to provide the welder with a constant flow of cool air.

While I have described my invention with particular reference to the drawings, such is not to be considered as limiting its actual scope.

Having thus described this invention, what is asserted as new is:

1. A welder protection device comprising:
a mask;
a shield secured to said mask and having a horizontal elongated eye viewing slot therein;
a pair of spaced vertical rails disposed adjacent said slot;
an arc welding glass plate disposed slidably in said slot and having a closed position at which it is disposed in the viewing path through said slot, and an open position at which it is moved out of said path;
an electric motor mounted in said device for rotation;
batteries mounted in said device for electrically powering said motor;
a mouth operated switch electrically connected in a circuit between said batteries and motor for controlling the rotation of said motor;
and a wind-up spool rotated by said motor and a line having one end secured to said spool and an opposite end secured to said plate for moving said plate into said respective positions.

2. A device as set forth in claim 1 further including means to normally spring bias said plate in the closed position.

References Cited

UNITED STATES PATENTS

| | | | |
|---|---|---|---|
| 2,058,169 | 10/1936 | Montague | 2—8 XR |
| 2,171,052 | 8/1939 | Tater | 2—8 |
| 2,613,353 | 10/1952 | Schnitzler | 2—8 |
| 2,644,161 | 7/1953 | Meyer | 2—8 |
| 3,327,317 | 6/1967 | Vattuone | 2—8 |
| 3,368,220 | 2/1968 | Wenzel | 2—8 |

JAMES R. BOLER, Primary Examiner